(12) United States Patent
Tomioka et al.

(10) Patent No.: US 8,455,810 B2
(45) Date of Patent: Jun. 4, 2013

(54) OPTICAL ELEMENT, IMAGING OPTICAL SYSTEM, AND CAMERA MODULE

(75) Inventors: Ryoko Tomioka, Saitama (JP); Tetsuya Okumura, Saitama (JP); Takayuki Noda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 471 days.

(21) Appl. No.: 12/687,447

(22) Filed: Jan. 14, 2010

(65) Prior Publication Data

US 2010/0176281 A1 Jul. 15, 2010

(30) Foreign Application Priority Data

Jan. 15, 2009 (JP) .................. P2009-006588

(51) Int. Cl.
*H01L 27/00* (2006.01)
*H01L 31/00* (2006.01)
*G02B 5/18* (2006.01)

(52) U.S. Cl.
USPC .............. 250/214.1; 250/208.1; 359/566

(58) Field of Classification Search
USPC ............ 250/221, 208.1, 214.1; 359/566, 359/569, 704
See application file for complete search history.

(56) References Cited

U.S. PATENT DOCUMENTS

| 7,417,808 | B2 | 8/2008 | Noda et al. | |
|---|---|---|---|---|
| 2002/0034010 | A1* | 3/2002 | Maruyama | 359/566 |
| 2005/0123238 | A1 | 6/2005 | Ito | |
| 2008/0170297 | A1 | 7/2008 | Shinozawa | |
| 2008/0181601 | A1 | 7/2008 | Shintani | |
| 2008/0186592 | A1 | 8/2008 | Sakaki | |
| 2009/0225405 | A1* | 9/2009 | Fujimoto | 359/356 |
| 2009/0310223 | A1 | 12/2009 | Matsuoka et al. | |

FOREIGN PATENT DOCUMENTS

| JP | 2000-147346 A | 5/2000 |
|---|---|---|
| JP | 2004-309567 A | 11/2004 |
| JP | 2005-77616 A | 3/2005 |
| JP | 2005-170711 | 6/2005 |
| JP | 2005-202020 A | 7/2005 |
| JP | 2005-257850 A | 9/2005 |
| JP | 2005-309289 A | 11/2005 |
| JP | 2006-195331 A | 7/2006 |
| JP | 2008-122801 A | 5/2008 |
| JP | 2008-175991 A | 7/2008 |
| JP | 2008-175992 A | 7/2008 |
| JP | 2008-185772 A | 8/2008 |

OTHER PUBLICATIONS

JP Office Action issued in counterpart JP application No. 2009-006588 on Jun. 27, 2012.

* cited by examiner

*Primary Examiner* — Georgia Y Epps
*Assistant Examiner* — Don Williams
(74) *Attorney, Agent, or Firm* — Birch, Stewart, Kolasch & Birch, LLP (57) ABSTRACT

An optical element incorporated into an imaging optical system, comprising: an effective diameter area that allows effective light flux contributing to imaging to pass, a non-effective diameter area that surrounds the effective diameter area; and an outer peripheral face that surrounds the non-effective diameter area. The effective diameter area, the non-effective diameter area and the outer peripheral face are centered on an imaging optical axis. At least a thickness-direction part of the outer peripheral face or a circumferential part thereof is a non-parallel face having an inclination to an imaging optical axis. A light incident from a face of an object side, reflected on a face of an image-plane side to the outer peripheral face and reflected on the outer peripheral face is not incident to an image plane.

11 Claims, 8 Drawing Sheets

- Related Art -

OPTICAL ELEMENT, IMAGING OPTICAL SYSTEM, AND CAMERA MODULE

CROSS-REFERENCE TO RELATED APPLICATIONS

This application is based on and claims priority under 35 USC 119 from Japanese Patent Application No. 2009-006588 filed on Jan. 15, 2009; the entire of which are incorporated herein by reference.

BACKGROUND

1. Technical Field

The present invention relates to an optical element such as a lens and a filter, an imaging optical system using the optical element for a part thereof, and a camera module in which a lens unit formed by incorporating the imaging optical system into a lens barrel and an imaging unit provided with a solid state imaging element are integrally combined.

2. Related Art

Digital cameras are provided with a CCD or CMOS imaging element and an imaging optical system forming an optical image of a photography subject on an imaging surface of the imaging element. The imaging element is configured as an imaging unit mounted on a circuit board with IC chips for driving the imaging element or processing imaging signals and the imaging optical system is generally configured as a lens unit incorporating an imaging lens into a barrel. In general digital cameras, the imaging unit and the lens unit are individually mounted on a camera case. Meanwhile, the digital cameras are widely built into mobile apparatuses such as mobile phones and PDAs, and such built-in digital cameras are required to be compact. In such built-in digital cameras, the lens unit and the imaging unit are connected to each other to be a module, and the camera module is incorporated into a needed part of a main case of a mobile apparatus.

Recently, the above-described camera module digital cameras are further required to be compact and have high definition. To be high definition, it is not only necessary to increase the number of pixels of the imaging element but also to thereby improve the optical performance of the imaging optical system. It is also indispensable to prevent image quality from decreasing due to flare or ghost. To reduce flare and ghost, a part of flange surface of a lens, is coated with ink to suppress internal reflection so that undesirable light incident to the non-effective diameter area of a part of lenses constituting the imaging optical system or the outer peripheral face of the lens does not reach an effective screen area of the imaging element due to the suppressing of the internal reflection. In addition, a rough face or unevenness is formed on the needed part, and a light shielding plate is additionally provided. Such a method is disclosed in Patent Document 1 (JP-A-2008-175992 corresponds to US-A-2008/0170297) and Patent Document 2 (JP-A-2005-309289).

However, when the undesirable light is incident from the inside to the non-effective diameter area or the outer peripheral face of the lens constituting the imaging optical system and the incident angle of the undesirable light is small and has sufficient intensity, it is difficult to attenuate the specular reflection light to the extent that there is no practical problems even when the incident face is coated with ink and is subjected to a rough face process. In addition, there is a case where the light is reflected with intensity to some extent and returns into the imaging optical system.

Figure 8:
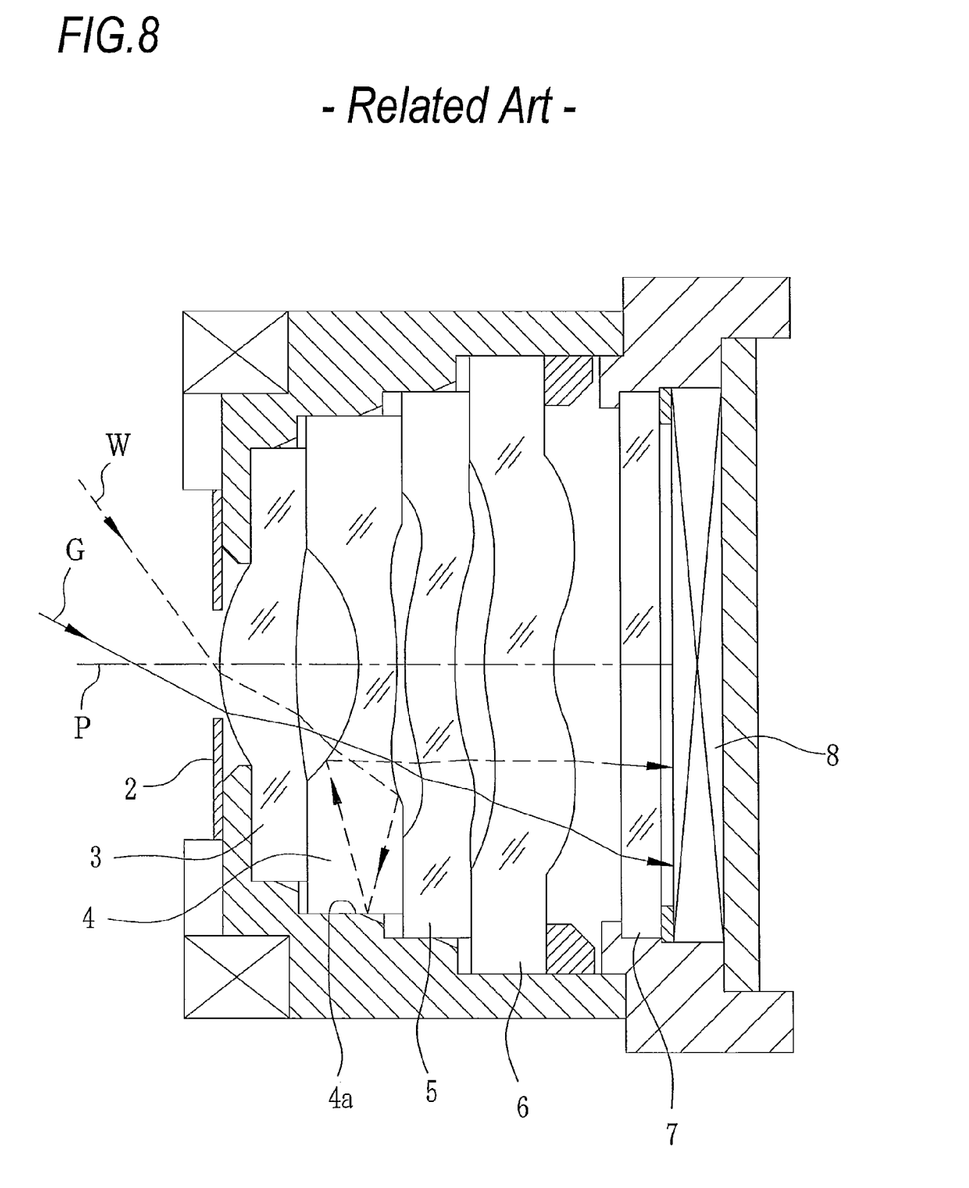
FIG. 8 is a cross-sectional view of main parts of the known camera module.

FIG. 8 shows an example thereof, an undesirable light W represented by a broken line is incident to a first lens 3 through an aperture diaphragm 2 with an incident angle larger than that of an imaging light G which is effective for imaging. The undesirable light W incident to the first lens 3 with the large incident angle travels toward a circumference of a second lens 4, the undesirable light W is internally and totally reflected by a surface close to an image plane of the second lens 4 with a convex surface facing an object side, particularly, at that part, and the undesirable light W is traveling toward an outer peripheral face 4a of the second lens 4 without substantially attenuating in intensity. The incident angle to the first lens 3 is set to be smaller than that of the undesirable light W, and thus the imaging light G is incident to an imaging element 8 without any problems even when the imaging light G is incident from the circumferential part of the first lens 3 as shown.

The undesirable light W, which travels toward the outer peripheral face 4a as described above, is incident to the outer peripheral face 4a with the small angle, and thus undesirable light in an angle range close to specular reflection is internally reflected to the second lens 4 again with intensity to some extent even when reflectance of the outer peripheral face 4a is suppressed to be sufficiently low by the rough face process or ink coating process. When a plastic formed lens is used as the second lens 4 or a formed lens made by pressing a preform made of heated glass is used, there are many cases where the rough face process or ink coating process of the outer peripheral face 4a is omitted to lower the cost. In such cases, most of the undesirable light incident to the outer peripheral face 4a passes and is absorbed in a lens barrel, but the undesirable light, which is specularly reflected to the outer peripheral face 4a and travels toward the inside of the second lens 4, still has sufficient intensity. When such undesirable light W is incident to the surface of the second lens 4 on the object side and particularly when a concave surface thereof is facing the object side, the undesirable light W is totally reflected toward an image-plane side as shown and is incident to a third lens 5 with a small angle. Then, the undesirable light passes through a fourth lens 6 and an infrared-light cut filter 7 toward the imaging element 8 and causes ghost or flare.

SUMMARY

An illustrative aspect of the invention is to provide an optical element, an imaging optical system, and a camera module which do not allow undesirable light to reach the imaging element with effective light flux even when the intensity of the undesirable light incident to an outer peripheral face of a lens is large and the undesirable light is re-incident into the imaging optical system without sufficiently attenuating the undesirable light reflected at an angle close to specular reflection.

In an optical element such as a lens and a filter used in an imaging optical system, a non-parallel face inclined with respect to an imaging optical axis is formed at least at a thickness-direction part of the outer peripheral face or at a circumferential part of the outer peripheral face, so that undesirable light incident from a face of an object side, reflected in the effective diameter area of a face of an image-plane side toward an outer peripheral face, and reflected on the outer peripheral face is not incident to the image plane.

The non-parallel face may be formed throughout the outer peripheral face in the thickness direction. However, in consideration of incorporation into a lens barrel, it is preferable that the non-parallel face is formed with a width equal to or less than ⅔ of the thickness direction and the other part is formed of a cylindrical face centered on an imaging optical axis. As for the circumferential direction, the non-parallel face may be selectively formed at a part to which undesirable light such as sun light and illumination light is easily incident, but may be provided throughout the whole periphery of the optical element. The non-parallel face may have a curved face shape represented by a curved line with an inclination continuously changing with respect to a longitudinal cross section including an imaging optical axis, as well as the inclination face inclined to the imaging optical axis at a regular angle. When the optical element is formed of, for example, a plastic two-color formed article or multi-color formed article, a boundary face of different color formation is formed to be included in the non-effective diameter area. Accordingly, the boundary face can be used as a non-parallel face inclined with respect to the imaging optical axis, and the outer peripheral face may be a cylindrical face centered on the imaging axis.

Such optical element is effective for undesirable light incident from the object side at a large angle. Accordingly, it is advantageous to use the optical element as the second or third lens close to the object side as compared with using the optical element near an image forming face. The invention can be more effectively used in the optical element having a lens surface with a shape of a convex surface on the object side at least at a part in the effective diameter area of the face on the image-plane side. In addition, as a built-in camera built in a mobile apparatus such a mobile phone, in order to make it be compact and thin, it is difficult to excessively increase the number of lenses, and thus the total number of lenses including an optical element such as a filter is suppressed to preferably about at most six and seven.

Such optical element can be applied as an imaging optical system including the optical element. In an imaging optical system including an aperture diaphragm, a first lens, a second lens, and a third lens in order from an object side, the optical element can be appropriately used as the second lens or the third lens. The invention can be applied in a type of a camera module formed by integrating an image unit provided with a solid state imaging element to a rear end of a lens barrel to which the imaging optical system is incorporated.

With the configuration of such optical element, when the undesirable light, which is incident at an angle larger than that of light contributing to imaging, is incident to the outer peripheral face and is internally reflected thereon, a reflection direction of the reflected undesirable light is changed by the non-parallel face and thus there is no case where the undesirable light travels toward the imaging element. As a result, it is possible to reduce ghost or flare caused by the undesirable light internally reflected on the outer peripheral face to the extent as much as causing no practical problem, even though a low reflection process such as a rough face process and an ink coating process is not performed on the outer peripheral face.

DETAILED DESCRIPTION

Figure 1:
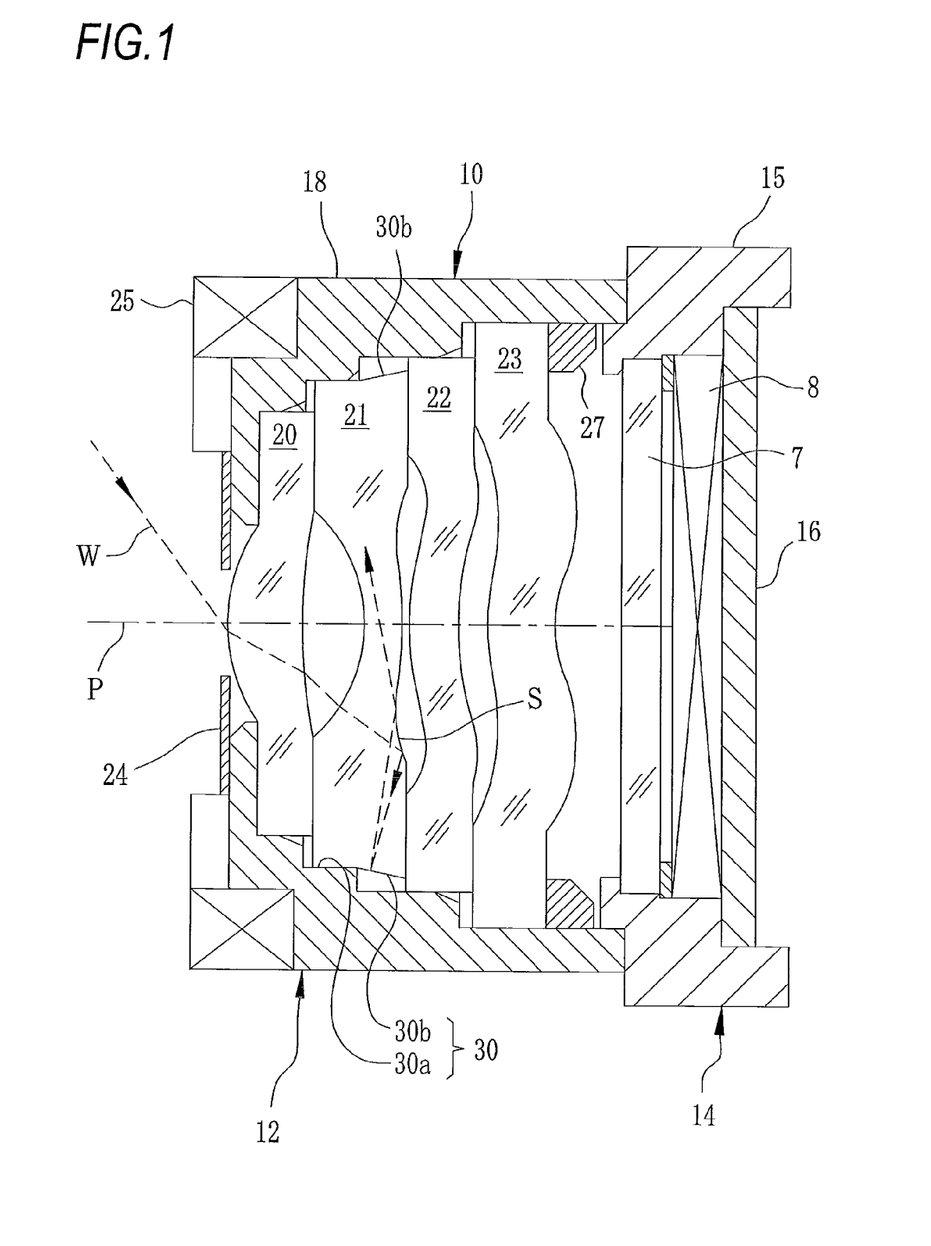
FIG. 1 is a cross-sectional view of main parts illustrating an embodiment of the invention.

As shown in FIG. 1, a camera module 10 for a mobile phone according to the exemplary embodiment of the invention is configured by combining a lens unit 12 with an imaging unit 14, and both are integrally connected after precise positioning using a light curing adhesive or the like. The imaging unit 14 is configured by incorporating a circuit board 16 provided with a filter 7 and an imaging element 8 mounted thereon into a holder 15. A wavelength selective filter cutting ultra-violet light or infrared light or an optical low pass filter, or the like, is used as the filter 7. An IC for driving the imaging element 8, an image signal processing IC, and the like, can be mounted on the circuit board 16. In addition, the circuit board 16 is connected to a proper processing circuit through a connector, a flexible wiring board, or the like.

In the lens unit 12, a first lens 20, a second lens 21, a third lens 22, and a fourth lens 23 in this order from an object side are incorporated into a lens barrel 18, and an aperture diaphragm 24 is provided on the front side of the first lens 20. An aperture diameter of the aperture diaphragm 24 can be changed by operating an actuator 25 provided in the lens barrel 18. The actuator 25 is subjected to a feed back control according to a brightness level of an imaging signal obtained from the imaging element 8, and thus an AE control can be performed. In addition, the AE control can be performed such that the aperture diaphragm 24 is used as a fixed diaphragm, a gain of the imaging signal is controlled according to the brightness level, or a charge accumulating time of the imaging element 8 is controlled.

In the shown example, in order for the lens unit 12 to be compact and low cost, all the first to fourth lenses 20 to 23 are fixed to the lens barrel 18 and a pan focus type imaging optical system is configured. The lenses are incorporated from the rear end side of the lens barrel 18 in order from the first lens 20, and are fixed to the lens barrel 18 by fitting a pressing ring 27. A part of lenses is moved by a voice coil motor or the like while monitoring contrast information obtained for each pixel from the imaging signal, and thus an automatic focus function using an inner focus method or a rear focus method can be provided.

Figure 2:
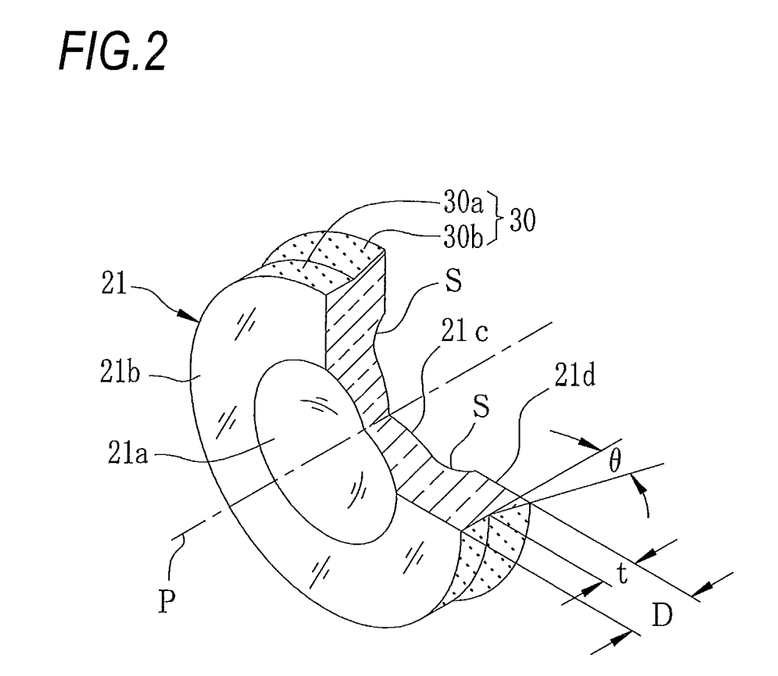
FIG. 2 is a partially cut away perspective view of a lens according to the invention.

The second lens 21 is configured by a formed lens integrally formed using a transparent plastic material, and has an effective diameter area 21a of which a concave surface is facing the object side and a non-effective diameter area 21b surrounding it on the face of the object side as shown in FIG. 2. In the same manner, an effective diameter area 21c formed of an aspheric face and a non-effective diameter area 21d surrounding it are formed on the face of the image-plane side. The effective diameter areas 21a and 21c allows effective light flux contributing to imaging to pass. The surfaces of the non-effective diameter areas 21b and 21d are formed on an inclined face perpendicular to an imaging optical axis P by a mold transfer face, but do not allow the effective light flux contributing to imaging to pass.

The outer peripheral face 30 of the second lens 21 includes a cylindrical face 30a centered on the imaging optical axis P and a non-parallel face 30b inclined on the image-plane side to increase the outer diameter and with an inclination with respect to the imaging optical axis P. The cylindrical face 30a is formed on the object side with respect to the thickness direction of the second lens 21, and the non-parallel face 30b is formed on the image-plane side. The outer peripheral face 30 formed of the cylindrical face 30a and the non-parallel face 30b is also a face formed by transfer of the mold, and the rough face process and ink coating process on the outer peripheral face 30 used to suppress the producing cost is omitted. In the embodiment, a width t of the non-parallel face 30b is ½ of a width D of the direction (thickness direction) of the imaging optical axis P of the outer peripheral face 30. Accordingly, ½ of the width D becomes the cylindrical face 30a parallel to the imaging optical axis P, and thus the incorporation and centering of the second lens 21 can be performed while bringing the cylindrical face 30a into contact with a generally cylindrical inner wall without providing an inner wall of the lens barrel 18 with an inclination face corresponding to the non-parallel face 30b as shown in FIG. 1.

For such incorporation, when the width of the cylindrical face 30a is ⅓ or more, there are no problems. Accordingly, it is preferable that the width t of the non-parallel face 30b is equal to or less than (⅔)D. Of course, the whole width D can be formed of the non-parallel face if an inclination face is formed on the inner wall of the lens barrel 18 with high precision. An inclination angle θ of the non-parallel face 30b with respect to the imaging optical axis P is preferably about 5° to 40°, and more preferably 5° to 20°. When the inclination angle θ is less than 5°, it is insufficient to change the direction of the internally reflected undesirable light. When the inclination angle θ is more than 40° and the width t of the non-parallel face 30b is to be secured to be about D/3 to D/2, there is a problem in that the non-effective diameter area 21d is enlarged and thus the whole outer diameter of the second lens 21 is increased. To set the width t of the non-parallel face 30b to practically preferable about D/2 and not to excessively enlarge the non-effective diameter area 21d on the image-plane side, it is preferable that the inclination angle θ is suppressed to be equal to or less than 20°.

The effective diameter area 21c of the second lens 21 on the image-plane side is formed of an aspheric face facing a convex curved surface S on the object side, particularly, a circumferential portion thereof. For optical design, the aspheric face has a shape in which the center portion of the concave surface is facing the object side. However, if it has a shape such that light, which is incident to the second lens 21 at a large angle and internally and totally reflected at the circumferential portion, travels toward the outer peripheral face 30, the embodiment can be applied even when the aspheric face has a shape in which an entire convex surface is facing the object side. The surface shapes of the first lens 20 to the fourth lens 23 on the object side and the image-plane side for image forming performance or aberration correction may be appropriately determined according to optical design.

The operation according to the above-described configuration will be described. Light is incident from the object side to the first lens 20 at various angles. However, as shown in FIG. 1, most of the undesirable light W causing ghost or flare is incident to the first lens 20 at an angle larger than that of the light contributing to imaging. The undesirable light W travels toward the circumferential portion in the effective diameter area of the second lens 21 through the first lens 20 and is incident to the convex curved surface S formed therein at a large angle. For this reason, the undesirable light W is internally and totally reflected on the convex curved surface S and is incident to the non-parallel face 30b formed on the outer peripheral face 30.

The non-parallel face 30b is inclined in a direction for decreasing the outer diameter facing the object side, and thus the undesirable light W reflected on the convex curved surface S is incident to the non-parallel face 30b at a relatively small incident angle. Most of the undesirable light W penetrates the non-parallel face 30b and reaches the inner wall of the lens barrel 18. However, most of the undesirable light W is absorbed on the inner wall of the lens barrel 18 in which reflectance is suppressed so as to be low.

A part of undesirable light W incident to the non-parallel face 30b is internally reflected at an angle substantially close to specular reflection. However, the incident angle with respect to the non-parallel face 30b becomes relatively small since the non-parallel face 30b is inclined in a direction which is farther away from the imaging optical axis on the image-plane side. Accordingly, the undesirable light W travels toward the outer peripheral face 30 opposite to the second lens 21 and is not incident to the image plane (equivalent to photoelectric surface of the imaging element 8). Even when the internally reflected undesirable light is incident to the effective diameter area of the second lens 21 on the object side or the image-plane side, the undesirable light is internally and totally reflected and is not incident to the imaging element 8 facing the outer peripheral face 30 opposite to the second lens 21, since the incident angle thereof is large. Accordingly, the undesirable light which has been twice incidence to the outer peripheral face 30 is attenuated to the extent such that there is no problem in intensity, and it is possible to drastically reduce ghost or flare even when the rough face process or ink coating process is not performed on the outer peripheral face 30.

When undesirable light incident at an angle slightly different from that of the shown undesirable light W is internally and totally reflected on the convex curved surface S, there is no change in incidence to the non-parallel face 30b at a small angle. Accordingly, the undesirable light reflected at an angle close to specular reflection from the non-parallel face 30b travels toward the outer peripheral face 30 opposite to the second lens 21 and is not incident to the image plane. Therefore, even when the undesirable light is incident to any one of the effective diameter area and the non-effective diameter area on the object side or the image-plane side, the incident angle is larger. Accordingly, the undesirable light does not travel toward the image-plane side since the undesirable light is internally and totally reflected and travels toward the opposite outer peripheral face therein.

Figure 3A:
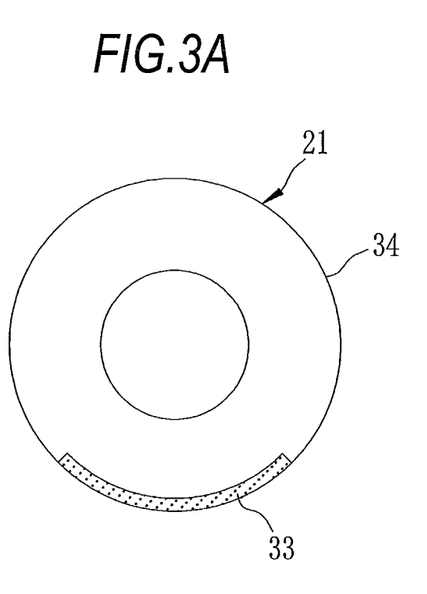
FIGS. 3A and 3B are a front view and a cross-sectional view illustrating another embodiment of the invention.
Figure 3B:
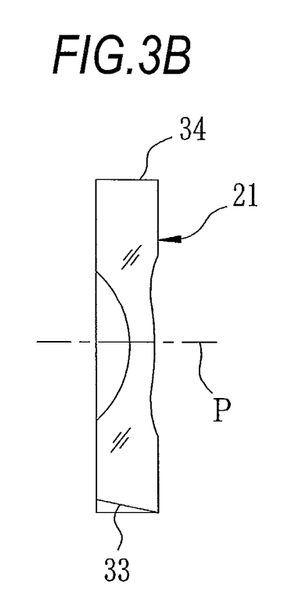

In the embodiment shown in FIG. 1, the non-parallel face 30b is provided throughout the whole periphery of the second lens 21. There are particularly many cases when the undesirable light with intensity is sun light or illumination light, and in most of these cases, the light source is incident from the upside to the imaging optical system. Therefore, as shown in FIGS. 3A and 3B, a non-parallel face 33 may be formed at a part of the downside of the second lens 21. The non-parallel face 33 has a shape in which only the downside is partially and obliquely cut and removed with respect to the outer peripheral face 34 which is made as a cylindrical face centered on the imaging optical axis P. However, it is of course possible to cope with this by only a shape of a mold used to plastically form the second lens 21.

Figure 4:
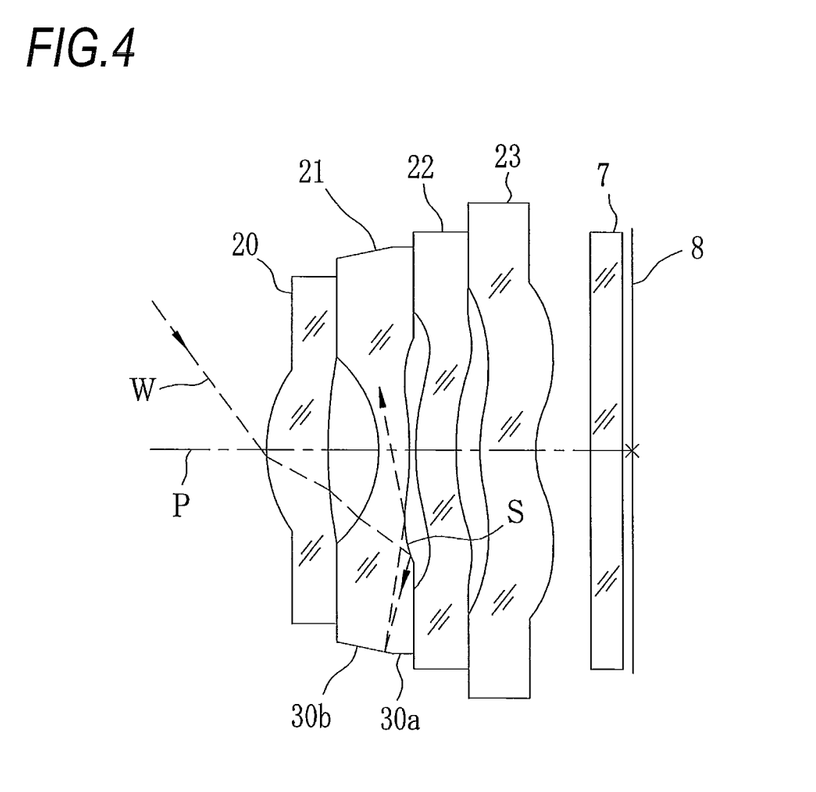
FIG. 4 is a cross-sectional view of main parts additionally illustrating another embodiment of the invention.

In the above-described embodiment, the non-parallel face 30b is formed with the ½ width in the thickness direction from the face on the image-plane side toward the face on the object side of the second lens 21. However, in the embodiment shown in FIG. 4, the non-parallel face 30b is formed with the about ⅔ of the thickness from the face on the object side toward the face on the image-plane side of the second lens 21. An x mark is given to the imaging element 8 and only the image forming face is shown. In this embodiment, the incident angle of the undesirable light W is smaller compared with the above-described embodiment, and this embodiment is effective when the undesirable light W internally and totally reflected on the face of the image-plane side of the second lens 21 reaches the outer peripheral face at a position close to the face on the object side of the second lens 21. Also in this embodiment, the cylindrical face 30a remains on the outer peripheral face, and thus it is possible to perform the centering of the second lens 21 using the cylindrical face 30a like as with the known method, even without providing the inner wall of the lens barrel with the inclination face in the same manner as the above-described embodiment.

Figure 5:
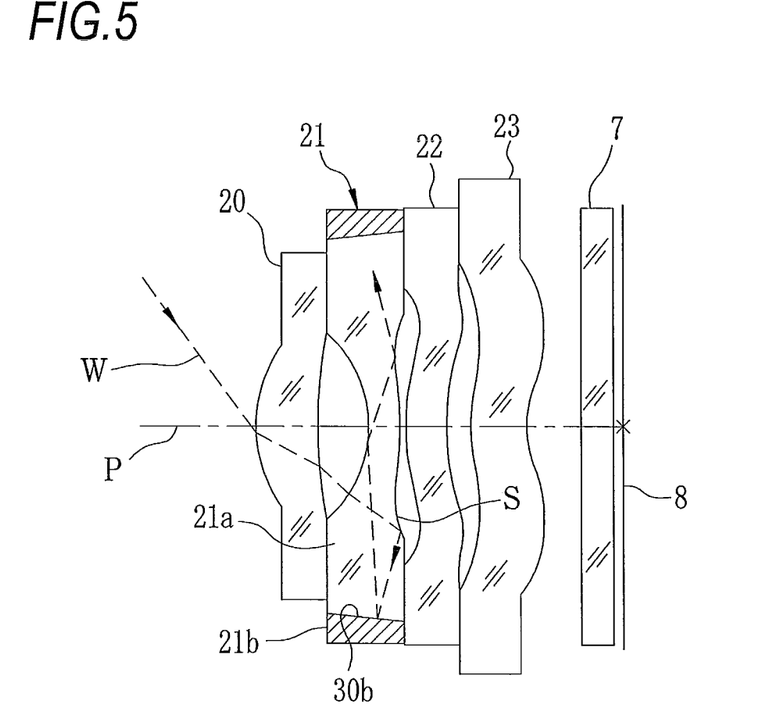
FIG. 5 is a cross-sectional view of main parts illustrating another embodiment of the invention.

FIG. 5 shows an embodiment effective at the time of producing the second lens 21 as a plastic two-color formed article or an insert formed article. The second lens 21 is formed of a main lens portion 21a including an effective diameter area and a part of non-effective diameter area surrounding an outer periphery thereof, and a circular ring portion 21b surrounding an outer periphery of the main lens unit 21a. For example, the circular ring portion 21b is formed of a plastic material different from that of the main lens portion 21a. A boundary face K between the main lens portion 21a and the circular ring portion 21b is inclined with respect to the imaging optical axis P as shown, and the boundary face K serves as the non-parallel face 30b described in the above embodiment. An outer peripheral face (cylindrical face) of the circular ring portion 21b becomes the outer peripheral face of the second lens 21, and thus it is possible to simply perform the incorporation into the lens barrel 18 as described above. This embodiment can be applied in the same manner when the second lens 21 is formed by multi-color formation of more than two colors.

Figure 6:
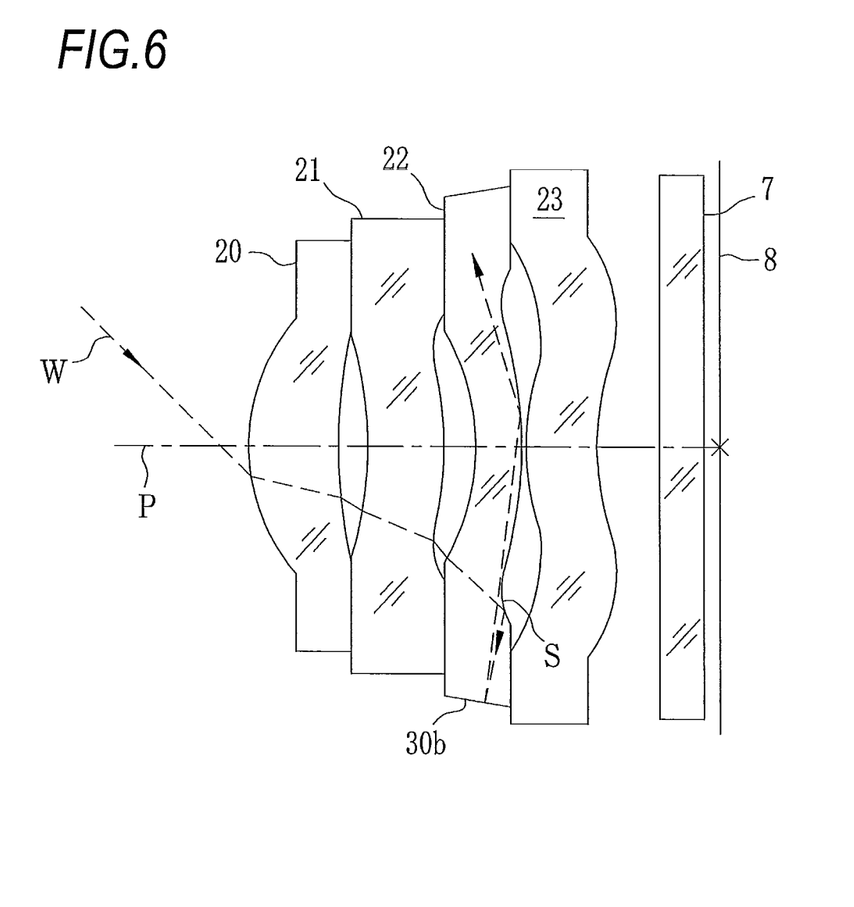
FIG. 6 is a cross-sectional view of main parts illustrating a first embodiment in the case of using the invention on a third lens.
Figure 7:
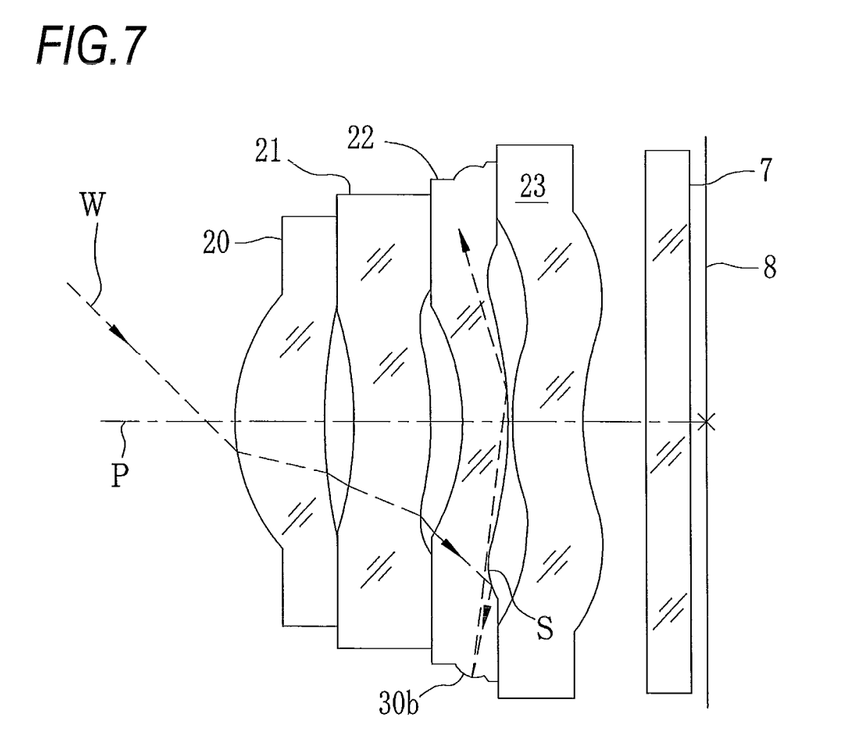
FIG. 7 is cross-sectional view of main parts illustrating another embodiment in the case of using the invention on a third lens.

In the embodiment shown in FIG. 6 and FIG. 7, the non-parallel face 30b is provided on the outer peripheral face of the third lens 22. Also, the curved surface S with a convex surface facing the object side is provided at the outer peripheral portion of the effective diameter area on the face of the image-plane side of the third lens 22. Accordingly, in any embodiment, the incident undesirable light W with a large angle is easily incident to the curved surface S at a large angle, and thus the undesirable light W is easily internally and totally reflected toward the outer peripheral face of the third lens 22. Thus, as shown in FIG. 6, the whole outer peripheral face of the third lens 22 may be the non-parallel face 30b inclined with respect to the imaging optical axis P. The non-parallel face 30b necessarily forms a straight line with respect to a cross section parallel to the optical axis, and may be formed of a curved face as shown in FIG. 7. The non-parallel face 30b can be recognized as a face represented by a curved line of which an inclination is continuously changing with respect to the longitudinal cross section including the imaging optical axis P, and the direction of the curved face preferably has a shape with a concave surface facing the imaging optical axis P in consideration of diffusion of the undesirable light. The non-parallel face 30b shown in FIG. 6 or FIG. 7 is formed in the whole circumferential direction of the third lens 22. However, as shown in FIGS. 3A and 3B, the non-parallel face 30b may be partially formed with respect to the circumferential direction.

As described above, Embodiment 1 has been described, but the invention may be embodied irrespective of a lens configuration or dimensions for optical design of the imaging optical system. As can be known from the above-described embodiments, there are many cases where the undesirable light incident to the first lens with the large angle is incident to the curved surface S when the curved surface S with the convex face facing the object side at the peripheral portion of, particularly, the effective diameter area is provided on the image-plane side of the second lens or the third lens close to the object side. Since the curved surface S has the convex face facing the object side, most of the undesirable light incident to that part is internally and totally reflected toward the outer peripheral face of the lens, and most of the light passes and is absorbed into the inner wall of the lens barrel, but a part is internally reflected on the outer peripheral face.

When the outer peripheral face is subjected to the rough face process or ink coating process, it is possible to drastically attenuate the undesirable light incident to the outer peripheral face. However, in the case of a formed lens being produced using a mold, the cost of the forming mold is increased due to the rough face process, and it is difficult to avoid higher costs due the ink coating process or later processing. From this viewpoint, in the invention, the outer peripheral face is provided with the non-parallel face inclined with respect to the imaging optical axis, and the undesirable light is reflected on the non-parallel face facing the direction in which the undesirable light is not incident to the image plane. Accordingly, it is possible to drastically reduce ghost or flare without causing higher costs due to the forming mold or the later processing. Even when the outer peripheral face is subjected to the rough face process or ink coating process, it is difficult to say that the intensity of the undesirable light internally reflected on the outer peripheral face in the angle range close to the specular reflection is sufficiently attenuated. Accordingly, it is possible to further reduce ghost or flare using the invention. In addition, the invention can be applied to the general optical elements such as filters as well as lenses.

When the aperture diaphragm is provided in the imaging optical system, the aperture diaphragm has an effect of shielding the undesirable light. Accordingly, there are many cases where it is not necessary to provide the non-parallel face of the invention. However, as described in the embodiments, the invention can be more effectively used in the imaging optical system in which the aperture diaphragm is provided only on the front surface of the first lens. In addition, the invention may be applied to either glass lens or plastic lens, and the non-parallel face may be formed in a cutting method or the like as well as the forming method.

What is claimed is:

1. An optical element incorporated into an imaging optical system, comprising:
    an effective diameter area that allows effective light flux contributing to imaging to pass;
    a non-effective diameter area that surrounds the effective diameter area; and
    an outer peripheral face that surrounds the non-effective diameter area,
    wherein the effective diameter area, the non-effective diameter area and the outer peripheral face are centered on an imaging optical axis,
    at least a thickness-direction part of the outer peripheral face or a circumferential part thereof is a non-parallel face being inclined with respect to the imaging optical axis so that the outer diameter of the optical element at the non-parallel face gradually increases toward an image-plane side, and
    a light incident from a face of an object side, reflected on a face of the image-plane side to the outer peripheral face and reflected on the outer peripheral face is not incident to an image plane,
    wherein the optical element is incorporated with a plurality of lenses into the imaging optical system.

2. The optical element according to claim 1,
wherein the non-parallel face is formed with a width equal to or less than ⅔ of the outer peripheral face in the thickness direction, and
the whole or a part of the other outer peripheral face has a cylindrical shape centered on the imaging optical axis.

3. The optical element according to claim 1,
wherein the non-parallel face is a curved face represented by a curved line having an inclination continuously changing with respect to a longitudinal cross section including the imaging optical axis.

4. The optical element according to claim 1,
wherein the optical element is a formed article made by integrally forming the effective diameter area and the non-effective diameter area including the outer peripheral face.

5. The optical element according to claim 1,
wherein the optical element is a lens used at the second or thereafter from the object side in the imaging optical system that includes at least two lenses, and
the optical element has a concave surface on the object side in the effective diameter area directed to the object side.

6. The optical element according to claim 5,
wherein the optical element has a convex surface and a concave surface surrounding the convex surface, said concave surface and said convex surface being on the image-plane side in the effective diameter area directed to the image-plane side.

7. The optical element according to claim 5,
wherein the optical element is disposed closer to the image-plane side than a stop, and
an effective diameter area on the image-plane side is wider than the effective diameter area on the object side.

8. An imaging optical system comprising, in order from an object side:
a stop;
a first lens;
a second lens; and
a third lens,
wherein any one of the second lens and the third lens is the optical element according to claim 5.

9. A camera module comprising:
a lens unit that is formed by incorporating the imaging optical system according to claim 8 into a lens barrel; and
an imagining unit that is fixed to a rear end of the lens barrel and keeps a solid state imaging element so that the imaging face coincides with the image plane.

10. The optical element according to claim 1,
wherein the outer peripheral face has a changing point located at a point equal to or less than ⅔ of the width of the outer peripheral face in the thickness direction, and
the non-parallel face has said inclination such that the outer diameter of the optical element gradually increases from said changing point toward the image-plane side.

11. An optical element incorporated into an imaging optical system, comprising:
an effective diameter area that allows effective light flux contributing to imaging to pass;
a non-effective diameter area that surrounds the effective diameter area; and
an outer peripheral face that surrounds the non-effective diameter area,
wherein the effective diameter area, the non-effective diameter area and the outer peripheral face are centered on an imaging optical axis,
the optical element is formed of a multi-color formed article having a circular-ring-shaped boundary face of the non-effective diameter area,
at least a thickness-direction part of the boundary face or a circumferential part thereof is a non-parallel face having an inclination to an imaging optical axis,
a part of the outer peripheral face is a cylindrical face centered on the imaging optical axis, and
an undesirable light incident from the effective diameter area of a face of an object side, internally reflected on the effective diameter area of a face of an image-plane side toward the boundary face, and internally and specularly reflected on the boundary face is internally and totally reflected on the face of the object side or the image-plane side.

* * * * *